UNITED STATES PATENT OFFICE.

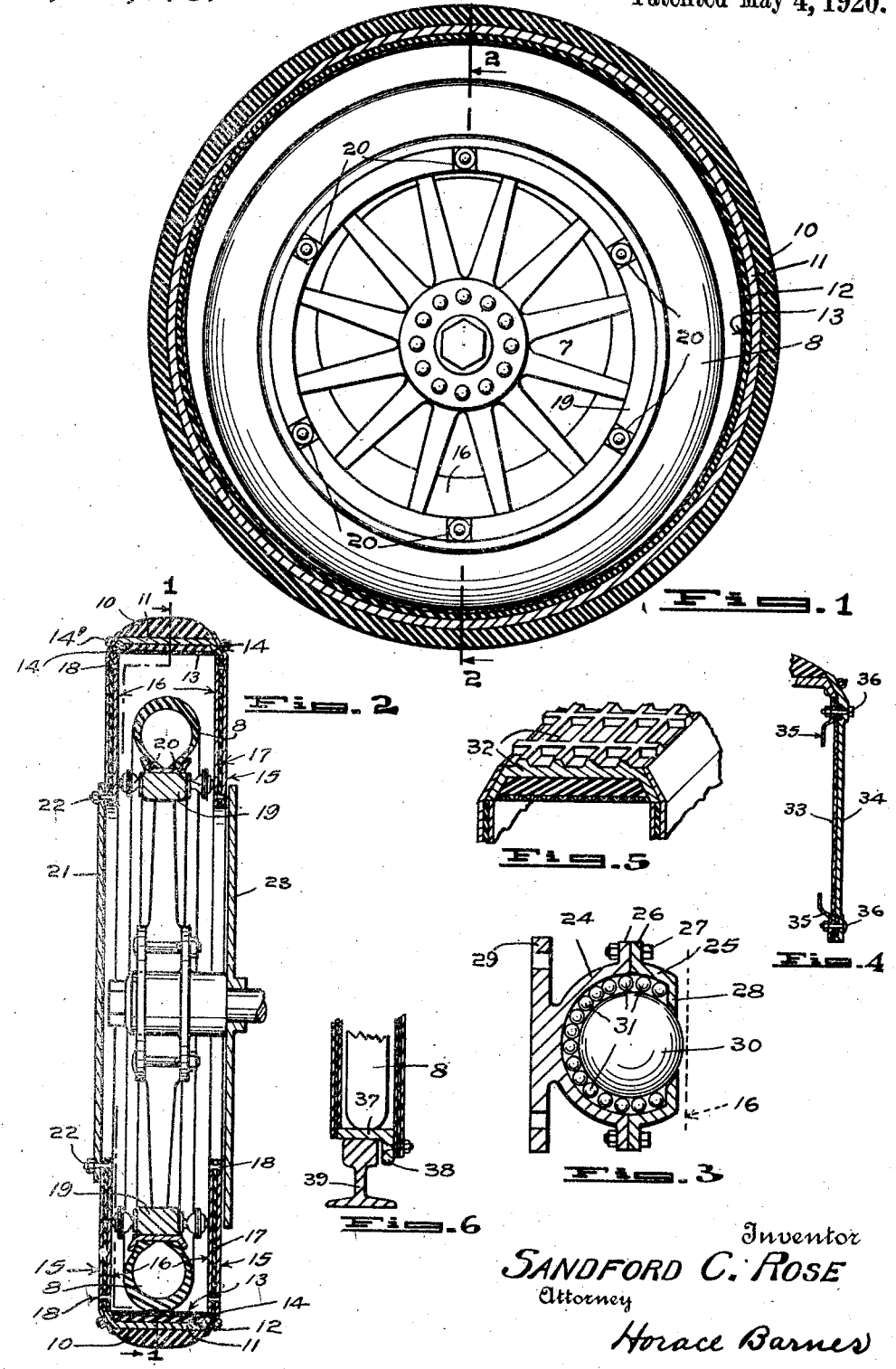

SANDFORD C. ROSE, OF PORT ANGELES, WASHINGTON.

WHEEL.

1,339,376.  Specification of Letters Patent.  Patented May 4, 1920.

Application filed January 20, 1919. Serial No. 272,015.

*To all whom it may concern:*

Be it known that I, SANDFORD C. ROSE, a citizen of the United States, and resident of the city of Port Angeles, in the county of Clallam, in the State of Washington, have invented certain new and useful Improvements in Wheels, of which the following is an exact and clear specification.

This invention relates to improvements in wheels of the type wherein a smaller wheel as an automobile wheel having a pneumatic tire thereon is disposed to run within a loosely mounted larger wheel or shell hereinafter termed a tread wheel, the lower portion of the tread wheel being between the pneumatic tire and the ground at all times thereby preventing punctures and excessive wear, without detracting from the resilient qualities of the tire.

One object of this invention is to provide an outer wheel or tread wheel that will exclude all dirt and moisture and that may be applied to automobile wheels of the usual form of construction.

A further object is to provide roller bearings that may be secured to the inner wheel and are adapted to make contact with suitable bearing plates on the tread wheel for the purpose of reducing friction and preventing relative wabbling movement between the tread wheel and the automobile wheel that is housed therein.

A still further object is to provide cushion means within the sides and within the tread portion of the tread wheel for absorbing shock and deadening the sound occasioned by the movement of the roller bearings over the bearing surfaces on the inside of the tread wheel.

The invention consists in the novel construction of a tread wheel of this class and in the adaptation and combination of the same with an automobile wheel as will be more clearly hereinafter described and claimed.

In the accompanying drawings Figure 1 is a view partly in section and partly in elevation substantially on a broken line 1—1 of Fig. 2 of a wheel constructed in accordance with the invention. Fig. 2 is a view in vertical section substantially on a broken line 2—2 of Fig. 1 of the same, certain parts being shown in elevation. Fig. 3 is an enlarged view partly in section and partly in elevation illustrating a ball bearing embodied in the invention. Fig. 4 is a fragmentary view in vertical cross section illustrating a modified form of side plate for the ball bearings to roll upon. Fig. 5 is a fragmentary view in perspective illustrating a modified form of tread surface for the tread wheel; and Fig. 6 is a fragmentary sectional view illustrating a tread wheel constructed in accordance with this invention and having a flanged peripheral portion by which it is adapted to run upon a rail.

In the construction of a practical wheel of this class it is necessary that the outer or tread wheel should be dirt and moisture proof so that no foreign substance can gain admission thereto, and so that the inner traction surfaces between the two wheels shall always be kept perfectly dry. It is also necessary that there shall be a guiding means between the two wheels which will prevent lateral or wabbling movement but which will operate with very little friction and allow comparatively free radial movement between the two wheels. The wheel herein disclosed is designed to meet both of these requirements.

Referring to the drawings, throughout which like reference numerals designate like parts the numeral 7 designates an automobile wheel of well known form of construction that is provided with a pneumatic tire 8 and is herein shown as disposed within a tread wheel constructed in accordance with this invention.

The tread wheel comprises a circular rim portion made up of a rubber or rubberized tread member 10, a circular metallic plate or hoop 11 whereon the tread member is secured, a circular rubber cushion member 12 disposed within the metallic hoop 11 and a layer of canvas or fabric 13 that forms the inner peripheral traction surface of the tread wheel and upon which the tire 8 runs.

The metallic hoop 11 is provided on its side edges with angularly disposed inwardly directed integral flanges 14 that are rigidly but removably secured by bolts 14' to the peripheral portions of annular metallic side plates 15, a relatively large circular opening being left in the central portion of the side plates which opening is closed by devices hereinafter described.

Disposed on the inside of the plates 15 and separated from such plates by rubber cushion members 17 are hard smooth metallic bearing plates 16, the bearing plates 16 being secured to the plates 15 by rivets or bolts 18 that extend through the plates 15 and 16 and through the cushion member 17.

Secured to the felly 19 of the wheel 7 at a plurality of points around the circumference thereof are roller bearings designated generally by the numeral 20, that project sidewise from the felly 19 and are adapted to bear against the plates 16, to prevent relative wabbling or lateral movement between the inner wheel and the tread wheel, the roller bearings 20 having a relatively slight working clearance from the plates 16 and running with a small amount of friction thus permitting free relative radial movement between the two wheels as they rotate eccentrically with respect to each other.

21 is a flat circular plate that is connected by bolts or screws 22 to the plates 15 and 16 on the outer side of the wheel to form a tight closing member for the outer side of the tread wheel. The inner side of the tread wheel is covered by a flat circular plate 23 that is preferably secured to the hub or to the axle of the wheel and is entirely disconnected from the tread wheel but is disposed in close proximity to the outer surface of the plate 15 so that it will exclude dirt and moisture from the interior of the tread wheel and at the same time will not prevent the automobile wheel from running eccentrically within the tread wheel.

The ball bearings designated generally by the numeral 20 each comprises a cup shaped receptacle formed of a base member 24 and an outer member 25 that are each flanged as at 26 and are secured to each other by bolts 27, the outer member 25 having an inwardly directed annular lip 28 on its front side, and the base member having a flange 29 by which it may be bolted to the felly 19 of the wheel. The bearings proper consist of large balls 30 that are disposed within the cup shaped members and supported for rotation upon smaller balls 31 as more clearly shown in Fig. 3.

By the form of construction just described a practically dirt proof and moisture proof tread wheel is produced which insures that the traction surface between the tread wheel and the pneumatic tire will always be dry and free from sand and grit which would tend to wear and cut the tire if it gained admission to the interior of the tread wheel.

In Fig. 4 I have illustrated a modified form of side plate which may be used in place of the side plates 16 to serve as a wearing surface for the ball bearings 20, such side plate comprising a bearing member 33 of closely woven heavy canvas or fabric saturated with lubricating oil that is securely clamped at its inner and outer edges between a metallic side plate 34 and annular flange plates 35 that are secured to the side plate 34 by bolts 36. The flange plates 35 are bent outwardly and arranged as shown in the drawing to serve as oil traps and catch any oil that would otherwise be thrown off by the canvas member 33 and prevent such oil from getting onto the inner traction surface of the tread wheel or onto the pneumatic tire. The lubricated canvas 33 serves to keep the ball bearings 20 lubricated and forms a surface on which such ball bearings will operate without noise.

Fig. 5 shows a metallic tread member 32 for the tread wheel which may be used instead of the rubberized tread member 10 shown in Figs. 1 and 2, the metallic tread being particularly well adapted for use on earth and gravel roads.

Fig. 6 illustrates a tread wheel of this class that is provided with a metallic tread member 37 having an outwardly directed flange 38 to guide it in well known manner for movement on a metal rail 39 thereby affording a structure which enables a vehicle with pneumatic tires to travel on a track of metal rails.

It will be understood that changes in the precise form of construction and arrangement of the various parts of this device may be resorted to within the scope of the following claims.

What I claim and desire to protect by Letters Patent is—

1. The combination with a smaller wheel having a pneumatic tire thereon, of a larger tread wheel arranged to inclose the said smaller wheel and run freely thereon, frame plates extending inwardly from both sides of the rim of said tread wheel, bearing plates secured to the inner sides of said frame plates, cushion members interposed between said bearing plates and said frame plates, means on both sides of said tread wheel for closing the central openings in said frame plates and ball bearings projecting outwardly from the rim of said smaller wheel to engage said bearing plates and guide said tread wheel for eccentric movement with respect to said smaller wheel.

2. The combination with a smaller wheel having a pneumatic tire thereon, of a larger tread wheel arranged to inclose said smaller wheel so that said smaller wheel may run freely within said larger wheel, said tread wheel comprising a rim portion formed of a metallic hoop, a rubberized tread secured to the exterior of said metallic hoop, a canvas traction member on the inside of said rim portion, a rubber cushion interposed between said metallic hoop and said canvas traction member, side plates secured to said metallic hoop the central portions of said side plates being cut away, bearing plates secured to the inner sides of said side plates, cushion members interposed between said bearing plates and said side plates, ball bearings secured to the rim of said smaller wheel to engage with said bearing plates and guide said tread wheel, a disk secured to said side plates to close the outer side of said tread wheel and another disk rigidly connected with the hub portion of said smaller wheel and adapted to lap over the edges of the bearing plates on the inner side of said tread wheel to close the inner side of said tread wheel.

3. The combination with a smaller wheel having a pneumatic tire thereon, of a larger tread wheel arranged to inclose the said smaller wheel and run freely thereon, frame plates extending inwardly from both sides of the rim of said tread wheel, bearing plates secured to the inner sides of said frame plates, cushion members interposed between said bearing plates and said frame plates, means on both sides of said tread wheel for closing the central openings in said frame plates, and anti-friction devices on said smaller wheel and bearing upon said tread wheel to engage said bearing plates and guide said tread wheel for eccentric movement with respect to said smaller wheel.

4. The combination with a wheel, of a larger tread wheel arranged to inclose said first-named wheel and run freely relatively thereto, said tread wheel comprising a metallic rim, a rubber tread exteriorly of said rim, cushion material on the inner side of said rim, side plates secured to said rim, the central portions of which are cut away, bearing plates secured to the inner side of said side plates, cushion members interposed between said bearing plates and said side plates, and anti-friction devices on said first-named wheel bearing upon said bearing plates.

5. The combination with a wheel, of a larger tread wheel arranged to inclose said first-named wheel and run freely relatively thereto, said tread wheel comprising a metallic rim, a rubber tread exteriorly of said rim, cushion material on the inner side of said rim, side plates secured to said rim, the central portions of which are cut away, bearing plates secured to the inner side of said side plates, cushion members interposed between said bearing plates and said side plates, anti-friction devices on said first-named wheel bearing upon said bearing plates, a disk secured to the side plates to close the outer side of said tread wheel, and another disk rigidly connected with the hub of said first-named wheel to close the inner side of said tread wheel and permit relative movement between said wheels.

Signed at Port Angeles, Washington, January 4th, 1919.

SANDFORD C. ROSE.